Oct. 23, 1956 J. F. JOY 2,767,800
STEERABLE TRACTION WHEEL AND DRIVE MECHANISM THEREFOR
Original Filed Dec. 20, 1948 4 Sheets-Sheet 4
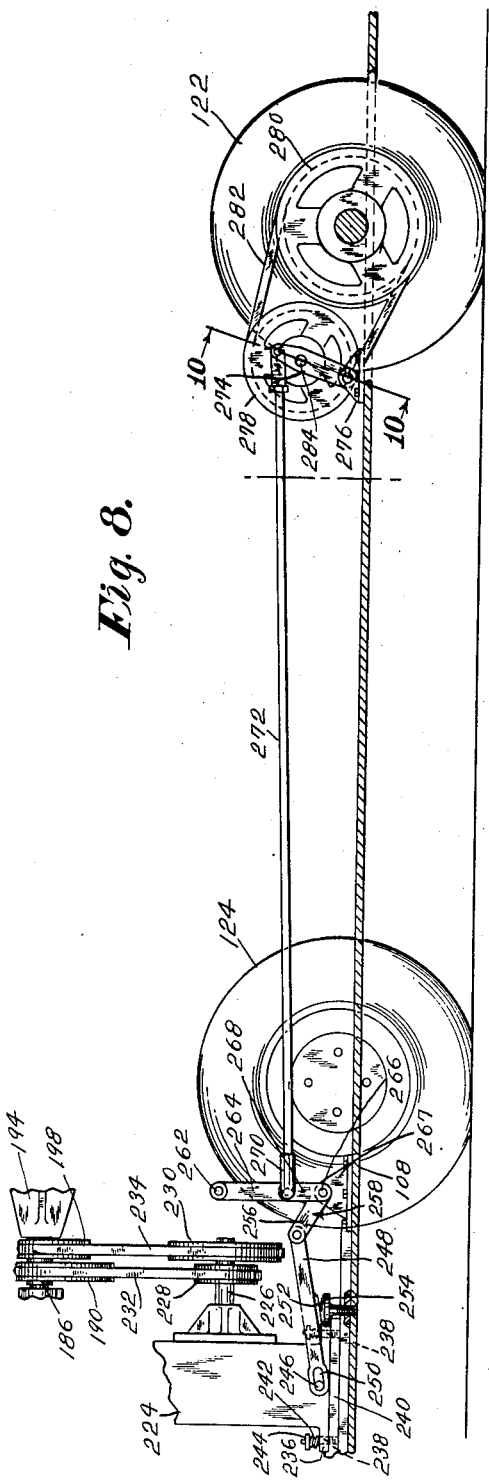
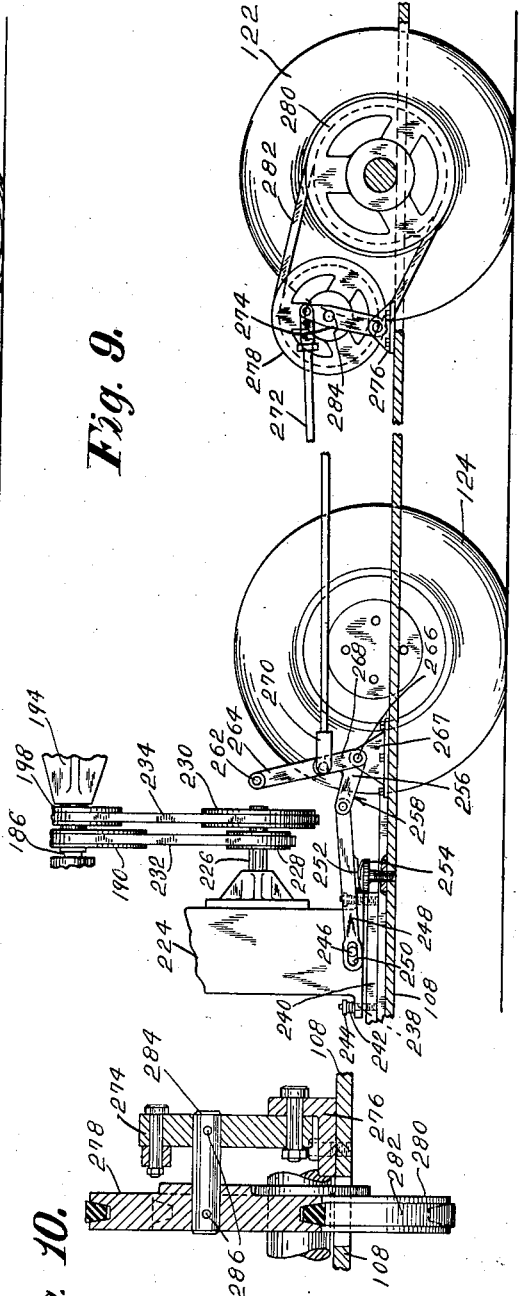
Inventor:
Joseph F. Joy
by John F. Schmidt
Attorney.

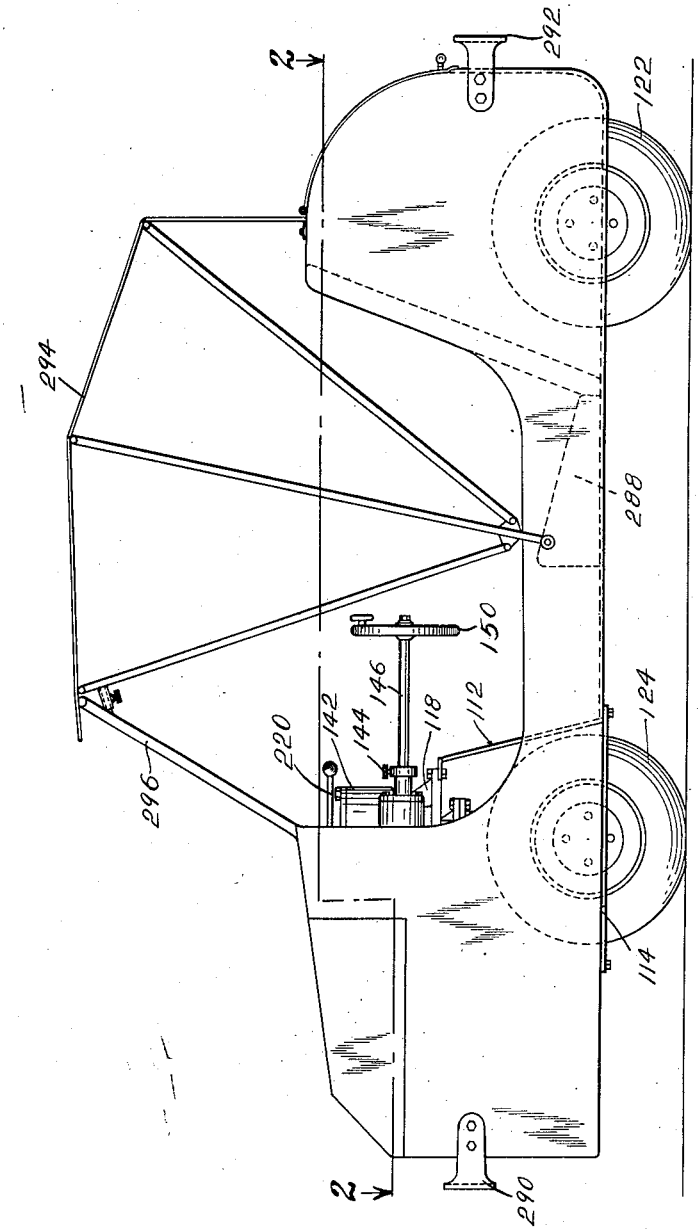

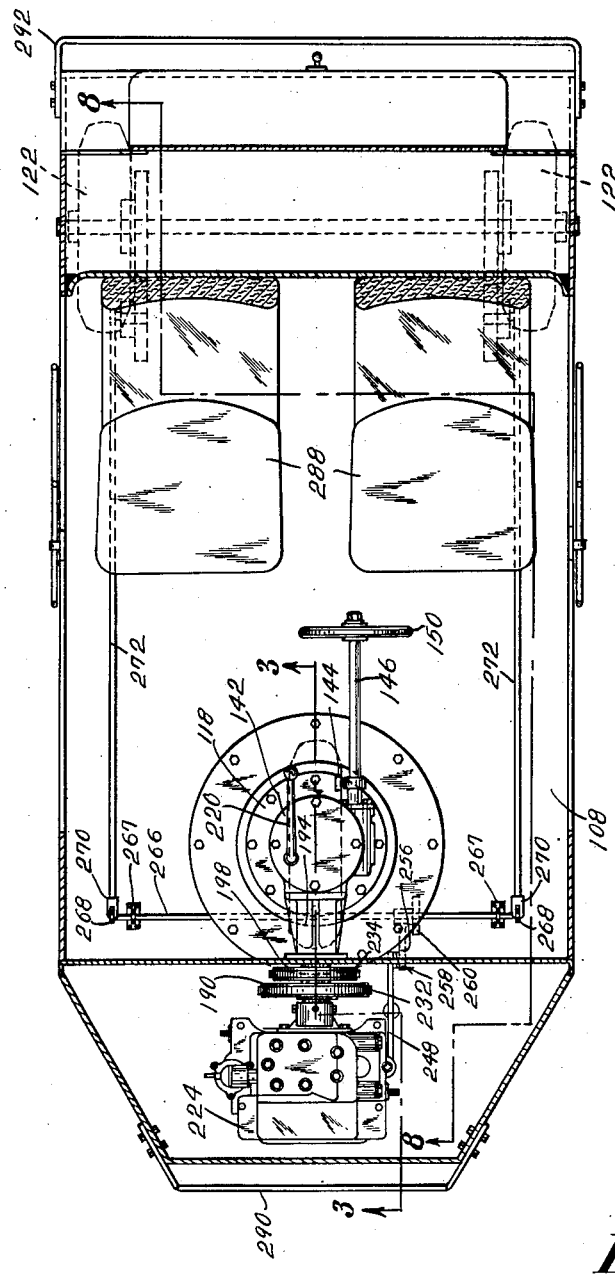

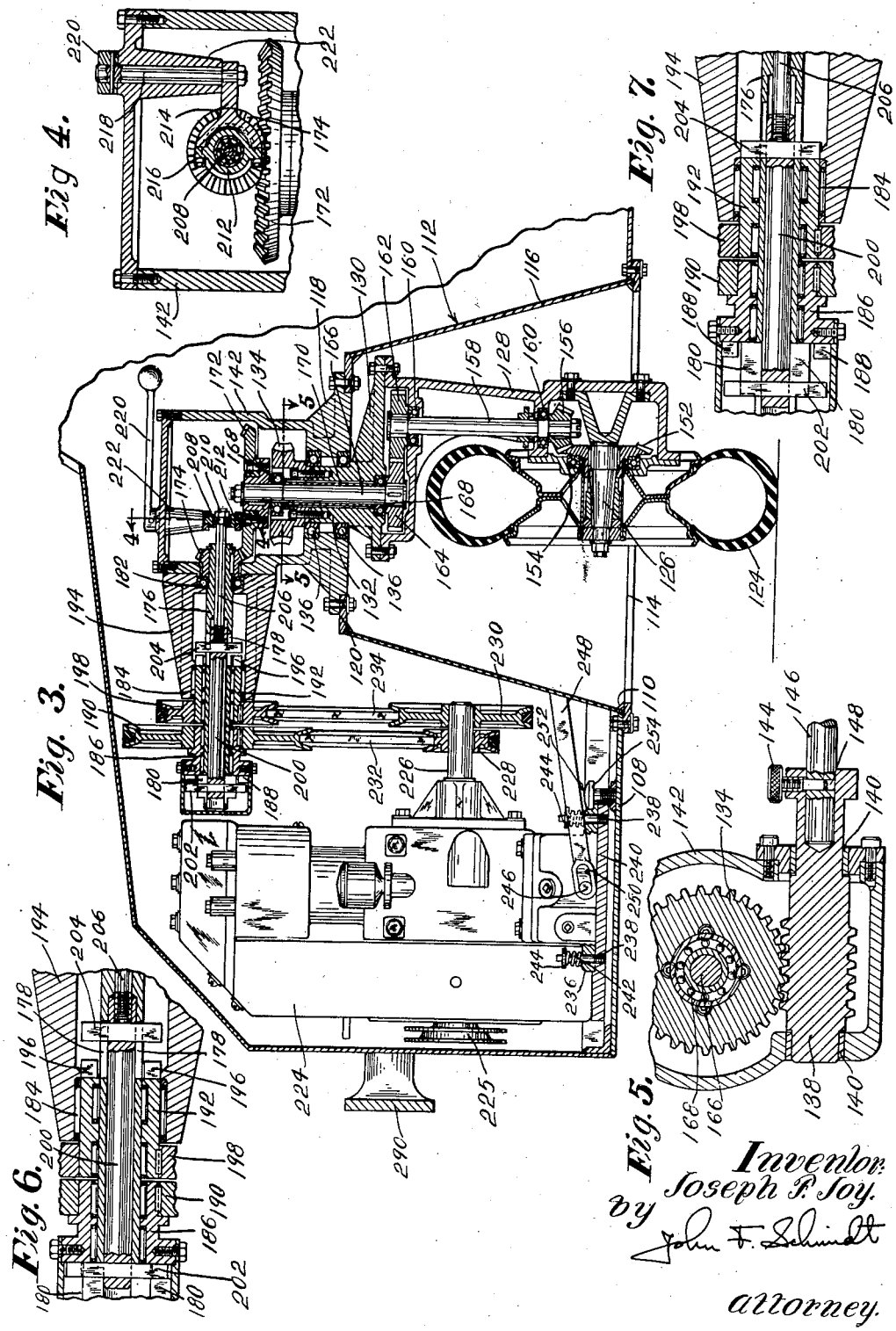

United States Patent Office 2,767,800
Patented Oct. 23, 1956

2,767,800

STEERABLE TRACTION WHEEL AND DRIVE MECHANISM THEREFOR

Joseph F. Joy, Pittsburgh, Pa., assignor to Joy Manufacturing Company, Pittsburgh, Pa., a corporation of Pennsylvania Original application December 20, 1948, Serial No. 66,246, now Patent No. 2,630,186, dated March 3, 1953. Divided and this application June 18, 1952, Serial No. 294,191

17 Claims. (Cl. 180—26)

This invention relates to a self-propelled wheeled vehicle, especially to a small, inexpensive vehicle adapted to carry one or two persons for short distances, and is a division of my copending application Serial No. 66,246, filed December 20, 1948, now matured into Patent No. 2,630,186, granted March 3, 1953, and assigned to the assignee of this invention.

There are situations in which it is desirable to use a small vehicle capable of carrying one or two persons at relatively low speeds for short distances. The vehicles available today are not suited to such applications, being far too large and expensive for the purpose. One application of the invention which may be cited as an example is that of a suitable vehicle for mine officials to get from place to place in or near a mine. Another example is a vehicle to be used to teach beginners the principles of driving.

It is an object of this invention to provide a small vehicle for one or two persons, capable of low or moderate speeds, which may be easily and inexpensively manufactured. This and other objects are accomplished in a vehicle having a very compact drive for its traction wheel. More specifically, the drive passes through the steering column.

In the drawings:

Fig. 1 is a side elevation view of an embodiment of the invention.

Fig. 2 is a view in section on line 2—2 of Fig. 1.

Fig. 3 is a view in section on line 3—3 of Fig. 2. In this figure the front wheel is shown turned at right angles to its forward running position in order to better illustrate various parts of the invention.

Fig. 4 is a view in section on line 4—4 of Fig. 3.

Fig. 5 is a view in section on line 5—5 of Fig. 3.

Fig. 6 is a detail of a portion of Fig. 3 illustrating the clutch shaft in position to engage one of the pulleys.

Fig. 7 is a detail similar to Fig. 6 but showing the clutch shaft in position to engage the other pulley.

Fig. 8 is a detail of the chassis showing the engine mounting, the clutch mechanism, and the brake mechanism.

Fig. 9 is a view similar to Fig. 8 but showing the clutch and brake mechanism in different operating positions from that illustrated in Fig. 8.

Fig. 10 is a view in section on line 10—10 of Fig. 8.

Referring now in detail to the drawings, there is shown a vehicle having a floor 108 in which there is an opening 110. A housing 112 is provided over the opening by means of a flange 114 welded to the lower end of the housing and bolted to the floor. The housing preferably consists of a frusto-conical portion 116 closed at its upper end by a bearing housing 118. The bearing housing 118 is secured to the wheel housing 112 by means of a mounting ring 120 which is preferably welded to the conical portion 116 and is bolted to the bearing housing. The vehicle is provided with rear wheels 122, and is supported thereon in any suitable manner. A third load carrying wheel 124 is dirigibly mounted in the wheel housing 112 for rotation about a horizontal axis provided by the short axle 126. Axle 126 is preferably bolted to a bracket 128. The bracket 128 is in turn secured to the lower end 130 of a steering column 132, to the upper end of which there is secured, by any suitable means, a worm wheel 134.

The short axle 126 and its associated members provide means to support the wheel 124 for rotation about a horizontal axis. That support means is in turn mounted for rotation about a vertical axis provided by the aforesaid steering column 132. Steering column 132 is rotatable in the bearing housing 118 by means of bearings 136. Dirigible wheel 124 is turned for steering by means of a worm 138 cooperating with the aforesaid worm wheel 134. Worm 138 rotates in bearings 140 in a housing 142 and is provided at its one end with a set screw 144. A steering shaft 146 is preferably provided with a transverse opening 148 to receive the end of set screw 144. Manually operable means, such as the steering wheel 150, is preferably provided at the rearmost end of the steering shaft 146.

Drive means for the traction wheel 124 are provided to pass through the mounting means described above. As is best seen in Fig. 3, a bevel gear 152 is connected to the hub of traction wheel 124 in order to drive the wheel. A bearing 154 supports the gear 152 for rotation. Gear 152 meshes with another bevel gear 156 which is secured to a shaft 158, mounted in its turn for rotation in bearings 160. To the upper end of shaft 158 there is secured a gear 162 which meshes with a gear 164 keyed to a drive shaft 166. The drive shaft 166 is mounted inside and is coaxial with the steering column 132. Drive shaft 166 is mounted for rotation in antifriction bearings 168 and a bushing 170. To the upper end of drive shaft 166 there is secured a bevel gear 172 which meshes with a bevel gear 174 mounted on another shaft 176. Said other shaft 176 may conveniently herein be referred to as the longitudinal shaft. The longitudinal shaft 176 is hollow, and is provided with longitudinal slots 178 at opposite ends of a diameter, and is further provided with longitudinal slots 180 at opposite ends of another diameter. Shaft 176 is rotatable in bearings 182 and 184, as will be more fully described below.

A hub 186 mounted on needle bearings on the outside of longitudinal shaft 176. At its one end the hub 186 is provided with a plurality of notches 188, and to its other end there is keyed, or otherwise non-rotatably secured, a pulley 190. A second hub 192 is mounted on the outside of shaft 176 on needle bearings, and itself rotates in the aforesaid needle bearing 184. Bearing 184 is provided in the bearing bracket 194. At its one end hub 192 is provided with a plurality of notches 196, and to its other end there is keyed, or otherwise suitably secured, a pulley 198.

A shiftable clutch shaft 200 is disposed inside the hollow longitudinal shaft 176. To one end of clutch shaft 200 there is secured a clutch pin 202 in position to cooperate with the notches 188. At the other end of clutch shaft 200 there is provided a clutch pin 204 in position to cooperate with the notches 196. In order that clutch shaft 200 may be reciprocated longitudinally inside shaft 176, it is secured at its one end to a shifting member 206. Shifting member 206 is mounted to be driven with shaft 176 when the clutch is engaged.

At the rearmost end of shifting member 206 there is provided a reduced diameter portion forming a shoulder. An antifriction bearing 208 is clamped between the shoulder and a nut 210 screwed to the end of shifting member 206. The outer raceway of the bearing 208 is held in a shift collar 212, to which there is pivotally secured a shifter yoke 214. The bifurcated ends of the shifter yoke are slotted, as shown at 216, to receive the pivot pins of the shift collar 212. Shifter yoke 214 is secured to the lower end of a shaft 218, to the upper end of which there is secured a shift lever 220. Shaft 218 has oscillatory motion in a bearing boss 222.

In the forward portion of the vehicle there is provided a suitable power plant or prime mover, such as an internal combustion engine 224. Engine 224 is preferably provided with a starter pulley 225 which is adapted to be engaged by a rope wrapped around the pulley for the purpose of starting the engine. An engine shaft 226 is provided at the rear end of the engine, and to the shaft 226 there are secured pulleys 228 and 230. A belt 232 connects the pulleys 228 and 190, and a belt 234 connects the pulleys 230 and 198.

As will be well understood by those skilled in the art, the arrangement described above and shown in the appended drawings is such that pulleys 228 and 230 rotate constantly as long as engine 224 is running. In order that clutch shaft 200 may be moved to engage either pulley 190 or 198 without shock to the mechanism, means are provided to prevent the rotation of the latter two pulleys while they are being drivingly engaged with shaft 176 by the clutch shaft 200. In order that this may be accomplished, engine 224 is mounted in such a way that it may be raised to allow the belts 232 and 234 to have sufficient slack to prevent their being driven by pulleys 228 and 230.

As is best seen in Figs. 3, 8 and 9, the engine is provided with a flanged base 236, the flanges of which have openings to receive studs 238 screwed into a mounting plate 240. The engine 224 may normally be held down on the mounting plate 240 by its own weight, being restrained against longitudinal movement by the studs 238 cooperating with the openings in the flanges, or if desired the engine may be biased downward against the mounting plate 240 by means of springs 242 on the studs between the flanges on the engine base and collars 244 screwed on to the studs. A lifting boss 246 is provided at one side of the engine to lift the engine in order that the belts may be sufficiently slack to prevent their being driven. A lifter bar 248 is provided with a slot 250 which cooperates with the lifting boss 246. Lifting bar 248 has a wear pad 252 between its ends, which cooperates with a fulcrum 254. The fulcrum 254 is preferably a mushroom-shaped member screwed into the floor 108 of the vehicle. At its other end, lifting bar 248 is pivotally secured to one arm 256 of a rocker arm 258. The rocker arm is pivotally mounted on a bracket 260, and has a pedal 262 secured to the upper end of its other arm 264. The rocker arm 258, having arms 256 and 264, is keyed to a transverse rock shaft 266, which rocks in brackets 267.

Also keyed to rock shaft 266 are brake arms 268, to the upper ends of which clevises 270 are pivoted. A brake rod 272 engages each clevis and extends rearward to a brake mechanism associated with each rear wheel. The rear end of each brake rod 272 is connected to an arm 274 which is pivoted to a bracket 276. Between the ends of the arm 274 there is secured a pulley 278 in such a manner as to be non-rotatable relative to the arm 274. Secured to each wheel for rotation therewith is a pulley 280. A belt 282 engages both pulleys 278 and 280.

As is best seen in Fig. 10, pulley 278 is secured to arm 274 by means of a shaft 284. The shaft 284 is non-rotatably secured relative to both the pulley 278 and the arm 274 by any suitable means, as, for example, by the pins 286 shown.

The vehicle is provided with suitable seats 288 for its occupants, and the body may conveniently be furnished with front and rear bumpers 290 and 292. If desired, some form of collapsible top 294 may be supplied, as well as a windshield 296.

As is probably best seen in Figs. 3 and 8, the engine is located well forward of the traction wheel 124, and the passenger seats 288 are of course behind the traction wheel. The result of this arrangement is a substantial balancing of the load on the traction wheel 124. A consequence of this arrangement is a high degree of traction for the wheel 124.

It will of course be understood by those skilled in the art that the load including the passengers cannot be perfectly balanced on the traction wheel, because if that were the case, when the passengers leave the vehicle, it would nose over with the axle of the traction wheel as a pivot axis. There must, in other words, be sufficient weight back of the traction wheel to keep the rear wheels 122 in contact with the ground when the vehicle is empty.

*Operation*

The operator starts the engine by wrapping a starting rope, or other expedient, around the starting pulley 225, and pulling sharply on the rope as will be well understood by those skilled in the art. With the engine running, and the clutch shaft 200 in the position shown in Fig. 3, the operator presses pedal 262 forward, lifting one side of engine 224 sufficiently to provide such slack in belts 232 and 234 as will prevent their being driven by the drive pulleys 228 and 230. Pulleys 228 and 230 thereupon rotate inside the loose belts without driving them, permitting the operator to shift the clutch shaft 200 into low speed by means of shift lever 220. In order to get the vehicle under way, or to operate it where considerable power is required, the operator will manipulate lever 220 to the right as seen from the rear of the vehicle, or counterclockwise as seen from above, causing clutch pin 202 to engage the notches 188 in the hub 186. The operator thereupon releases his pressure on the pedal 262 and the engine proceeds to drive the traction wheel 124 through the following power train: engine shaft 226, pulley 228, belt 232, pulley 190, hub 186, notches 188, clutch pin 202, the sides of slots 180, longitudinal shaft 176, gears 174 and 172, drive shaft 166, gears 164 and 162, shaft 158, gears 156 and 152, and the hub of wheel 124.

Where the operating conditions permit a higher speed, the operator may shift into high speed by raising the engine to provide slack in the belts, manipulating shift lever 220 clockwise as seen from above to disengage pin 202 from notches 188, and engage pin 204 in notches 196. The operator then releases the pedal, whereupon the drive is as before except that pulley 230, belt 234, pulley 198, hub 192, notches 196, and pin 204 drive the wheel at a higher speed than the corresponding members recited previously.

The vehicle is steered by manipulation of the wheel 150. The steering effort is applied through steering shaft 146, worm 138, worm wheel 134, steering column 132, and bracket 128 to turn the wheel. The vehicle is reversed by turning steering column 132 through 180°.

As pointed out above, a large proportion of the total load is carried by the forward wheel in order to provide good traction. The front wheel should carry from two-thirds to three-fourths of the total load.

The trend in modern mining methods is toward trackless mines, and vehicles made according to this invention are well adapted to trackless mining operations.

While there is in this application specifically described one form which the invention may assume in practice, it will be understood that this form of the invention may be modified and embodied in various other forms without departing from the spirit of the invention, or the scope of the appended claims.

I claim:

1. In a self-propelled wheeled vehicle having a body supporting a prime mover at its bottom, a ground engaging traction wheel recessed in the body rearwardly of said prime mover for propelling the vehicle, and driving means for said wheel including a shaft permanently extending longitudinally of the upper portion of the vehicle and connected to drive the traction wheel, two pulleys driven by the engine, two pulleys mounted to rotate freely on the shaft for effecting drive at relatively different speeds, two belts drivingly connecting the two prime mover driven pulleys with the other two pulleys, and means for selectively connecting one of said other two pulleys to the shaft thereby to effect drive of said wheel at either of two different speeds.

2. In a self-propelled wheeled vehicle having a body supporting a prime mover at its bottom and a prime mover shaft driven by the engine, a ground engaging traction wheel recessed within said body rearwardly of said prime mover for propelling the vehicle and driving means for said wheel including another shaft permanently extending longitudinally of the upper portion of the vehicle and connected to drive the traction wheel, two pulleys mounted on said prime mover shaft to be driven by it for effecting drive at relatively different speeds, two pulleys mounted to rotate freely on said other shaft, two belts drivingly connecting the two prime mover shaft pulleys with the other two pulleys, and means for selectively connecting one of said other two pulleys to said other shaft thereby to effect drive of said wheel at either of two different speeds.

3. In a self-propelled wheeled vehicle having a forwardly located prime mover and a shaft driven thereby, a ground engaging traction wheel located rearwardly of said prime mover for propelling the vehicle, and another shaft permanently extending longitudinally of the upper portion of the vehicle and connected to drive the traction wheel, a pair of pulleys freely rotatable on said other shaft and adapted to be driven at relatively different speeds by the prime mover, a shiftable clutch shaft inside said other shaft and coaxial therewith, means at one end of the clutch shaft for engaging one of the pulleys, means at the other end of the clutch shaft for engaging the other pulley, means to selectively move the clutch shaft to engage one of the pulleys, and means to drive said other shaft by the clutch shaft thereby to effect wheel drive at either of two different speeds.

4. In a wheeled vehicle having a body supporting a prime mover at its bottom, a ground engaging traction wheel located rearwardly of said prime mover for propelling the vehicle, and drive means for the traction wheel disposed with its axis permanently extending longitudinally of the vehicle above said wheel, belt mechanism connected to said prime mover to drive said drive means, and means to mount the prime mover for movement under operator control relative to the body-bottom to allow slack in the belt of the belt mechanism partially or wholly to interrupt drive.

5. The wheeled vehicle set forth in claim 4, in which the last named means includes an actuator operable by the operator and connected to effect movement of the prime mover to lift the latter from its supported position on the body to provide said slack.

6. In a wheeled vehicle having a body supporting a prime mover at its bottom, a ground engaging traction wheel, and drive means for the traction wheel disposed with its axis extending longitudinally of the vehicle above said wheel, belt mechanism connected to said prime mover to drive said drive means, means to mount the prime mover for movement under operator control relative to the body-bottom to allow slack in the belt of the belt mechanism partially or wholly to interrupt drive, means including an actuator operable by the operator and connected to effect movement of the prime mover to lift the latter from its supported position on the body to provide said slack, a brake mechanism for the vehicle, and means operatively connected to the actuator automatically to set the brake whenever the belt is provided with slack.

7. In a self-propelled vehicle, a body, ground engaging traction means for supporting and propelling said body, means for swivelly mounting said traction means on said body to provide for steering of the vehicle, and driving means for said traction means comprising a plural speed selective transmission mechanism including a terminal shaft arranged with its axis permanently extending longitudinally of said body and said mechanism disposed in a relatively high position on said body near the upper portion thereof above said traction means, and downwardly extending transmission connections extending below the bottom of said body between said longitudinal shaft and said traction means for driving the latter, said transmission connections including a transmission element coaxial with the swivel of said mounting means.

8. A vehicle as set forth in claim 7 wherein said traction means is disposed at the forward end of said body and said selective transmission mechanism is disposed at the forward upper portion of said body in horizontal planes directly above said traction means.

9. In a vehicle of the character disclosed, a body, supporting wheels therefor including a swiveled front traction and steering wheel, said body having a frusto-conical portion extending upwardly from the bottom of the forward portion of said body and providing a chamber in which said front wheel is arranged to turn about an upright axis, a housing supported by said frusto-conical body portion and supporting bearing means, said wheel having a supporting axle secured to a swiveled bracket journaled to turn in said bearing means about said upright axis, a prime mover arranged within the forward portion of said body, a transmission mechanism arranged at the upper portion of said body above said bearing means and including transmission elements supported by said housing, said transmission mechanism driven by said prime mover, and transmission means between said transmission mechanism and said front wheel including transmission gearing within said housing.

10. A self-propelled vehicle as set forth in claim 9 wherein steering means for the vehicle is provided comprising an operator controllable steering wheel mounted on said housing and operatively connected to said swiveled-wheel axle bracket.

11. In combination, a vehicle body, supporting and steering wheels for said body including a front ground engaging traction and steering wheel, a prime mover movably mounted within the forward portion of said body and normally supported against rotation about an upright axis at the bottom of the body and located forwardly of said traction and steering wheel, a transmission mechanism permanently mounted at the upper portion of said body above said front wheel and operatively connected to said front wheel, said front wheel being turnable relative to said transmission mechanism, a belt and pulley connection between said prime mover and said transmission mechanism, and operator controllable means for moving said prime mover in a vertical direction relative to said body from its normal supported position thereon to effect loosening of the belt of said belt and pulley connection to permit said belt to slip.

12. In combination, a vehicle body, supporting and steering wheels for said body including a front traction and steering wheel, a prime mover movably mounted within the forward portion of said body and normally supported at the bottom of the body, a transmission mechanism at the upper portion of said body above said front wheel and operatively connected to said front wheel, a belt and pulley connection between said prime mover and said transmission mechanism, operator controllable means for moving said prime mover relative to said body from its normal supported position thereon to effect loosening of the belt of said belt and pulley connection to permit said belt to slip, braking means for the rear wheels, and operative connections between said moving means for said prime mover and said braking means for automatically effecting application of said braking means whenever said prime mover is moved to effect loosening of said belt.

13. A combination as set forth in claim 12 wherein said braking means comprises a pulley operatively connected to the rear wheels to turn whenever the rear wheels turn, a non-rotatable pulley, an endless belt engaging said pulleys and means for moving said non-rotatable pulley towards and from said rotatable rear wheel pulley to effect loosening and tightening of said endless belt, the loosened belt engaging said non-rotatable pulley slipping while in frictional contact therewith to effect braking of the rear wheels.

14. A combination as set forth in claim 11 wherein said transmission mechanism is of the plural speed selective type and said belt and pulley connection comprises a pair of coaxial pulleys of different diameters fixed to the shaft of said prime mover, coaxial pulleys of different diameters coaxial with said transmission mechanism and belts engaging the two sets of pulleys whereby the front traction wheel may be driven at either of two different speeds.

15. A combination as set forth in claim 14 wherein said plural speed selective transmission mechanism includes coaxial relatively rotatable shafts permanently held against horizontal movement relative to the vehicle body and to which said last mentioned coaxial pulleys are respectively secured and shiftable clutch means is provided for selectively connecting said shafts in driving relation with said front traction wheel.

16. A combination as set forth in claim 15 wherein said plural speed selective transmission mechanism further includes a driven shaft coaxial with said coaxial shafts and operatively connected to the front traction wheel and said clutch means is operable selectively to connect said coaxial relatively rotatable shafts to said coaxial driven shaft.

17. A combination as set forth in claim 13 wherein said moving means for said prime mover includes a pivoted lever and said means for effecting application of said braking means includes a pivoted lever for swinging said non-rotatable pulley along an arcuate path, and a rod connection is provided between said pivoted levers whereby swinging of the former lever to move said prime mover effects swinging of the latter lever in unison therewith.

References Cited in the file of this patent

UNITED STATES PATENTS

| | | |
|---|---|---|
| 618,637 | Benier | Jan. 31, 1899 |
| 731,588 | Meinhard | June 23, 1903 |
| 1,129,906 | Roberts et al. | Mar. 2, 1915 |
| 1,310,542 | Pratt | July 22, 1919 |
| 1,342,765 | Schaaf et al. | June 8, 1920 |
| 1,439,851 | Templin | Dec. 26, 1922 |
| 1,833,844 | Lusse | Nov. 24, 1931 |
| 2,050,776 | Anderson | Aug. 11, 1936 |
| 2,280,182 | Zupan | Apr. 21, 1942 |
| 2,329,185 | Coddington | Sept. 14, 1943 |
| 2,375,046 | Steele | May 1, 1945 |
| 2,457,821 | Johnson | Jan. 4, 1949 |

FOREIGN PATENTS

| | | |
|---|---|---|
| 61,245 | Austria | Sept. 25, 1913 |
| 154,552 | Great Britain | Apr. 25, 1921 |
| 665,508 | Great Britain | Jan. 23, 1952 |
| 807,068 | France | Jan. 4, 1937 |